US011498270B2

(12) United States Patent
Rowe et al.

(10) Patent No.: US 11,498,270 B2
(45) Date of Patent: Nov. 15, 2022

(54) PROGRAMMABLE MATTER

(71) Applicant: Toyota Motor Engineering & Manufacturing North America, Inc., Plano, TX (US)

(72) Inventors: Michael Paul Rowe, Pinckney, MI (US); Umesh N. Gandhi, Farmington Hills, MI (US)

(73) Assignee: Toyota Motor Engineering & Manufacturing North America, inc., Plano, TX (US)

(*) Notice: Subject to any disclaimer, the term of this patent is extended or adjusted under 35 U.S.C. 154(b) by 552 days.

(21) Appl. No.: 16/197,639

(22) Filed: Nov. 21, 2018

(65) Prior Publication Data
US 2020/0156314 A1    May 21, 2020

(51) Int. Cl.
*B29C 64/20*    (2017.01)
*B29C 64/124*    (2017.01)
(Continued)

(52) U.S. Cl.
CPC ............ *B29C 64/20* (2017.08); *B29C 64/124* (2017.08); *B29C 64/393* (2017.08); *B33Y 30/00* (2014.12);
(Continued)

(58) Field of Classification Search
CPC ..... B29C 64/20; B29C 64/124; B29C 64/393; B33Y 30/00; B33Y 50/02; B33Y 70/00
See application file for complete search history.

(56) References Cited

U.S. PATENT DOCUMENTS 2,241,086 A    1/1939    Gould
4,286,910 A    9/1981    Conrad
(Continued)

FOREIGN PATENT DOCUMENTS

GB    2476792 A    7/2011
JP    H07303381 A    11/1995
(Continued)

OTHER PUBLICATIONS

Kamble et al. ("An Electromagnetically Actuated Double-Sided Cell-Stretching Device for Mechanobiology Research" Micromachines, Aug. 2017; 8(8): 256). (Year: 2017).*
(Continued)

*Primary Examiner* — Larry W Thrower
(74) *Attorney, Agent, or Firm* — Christopher G. Darrow; Darrow Mustafa PC

(57) ABSTRACT

The devices and systems described herein generally relate to magnetic field chambers and reversibly hardenable ferrofluids. The reversibly hardenable ferrofluid can include a magnetically responsive fluid and a reversible hardening agent. The reversibly hardenable ferrofluid can achieve a first shape using one or more magnetic fields, such as delivered from a magnetic field chamber. Once the first shape is achieved, the reversibly hardenable ferrofluid can be cured or otherwise hardened. The hardened reversibly hardenable ferrofluid can be used for the intended purpose and then returned to a liquid state once the task is completed, allowing for reuse. The steps of hardening and liquifying can be mediated by the magnetic field chamber, as described in embodiments herein.

19 Claims, 5 Drawing Sheets

(51) Int. Cl.
  *B29C 64/393* (2017.01)
  *B33Y 30/00* (2015.01)
  *B33Y 70/00* (2020.01)
  *B33Y 50/02* (2015.01)
  *B29K 505/08* (2006.01)
  *B29K 105/24* (2006.01)

(52) U.S. Cl.
  CPC .............. *B33Y 50/02* (2014.12); *B33Y 70/00* (2014.12); *B29K 2105/24* (2013.01); *B29K 2505/08* (2013.01); *B29K 2995/0008* (2013.01)

(56) References Cited

U.S. PATENT DOCUMENTS

| | | | |
|---|---|---|---|
| 4,319,427 A | 3/1982 | Way, Jr. | |
| 4,726,656 A | 2/1988 | Schofield et al. | |
| 4,848,179 A | 7/1989 | Ubhayakar | |
| 4,958,100 A | 9/1990 | Crawley et al. | |
| 4,964,062 A | 10/1990 | Ubhayakar et al. | |
| 5,021,798 A | 6/1991 | Ubhayakar | |
| 5,065,978 A | 11/1991 | Albarda et al. | |
| 5,222,668 A | 6/1993 | Frankeny et al. | |
| 5,502,345 A | 3/1996 | Kahn et al. | |
| 5,536,062 A | 7/1996 | Spears | |
| 5,668,432 A | 9/1997 | Tominaga et al. | |
| 6,065,978 A | 5/2000 | Dehan et al. | |
| 6,120,002 A | 9/2000 | Biegelsen et al. | |
| 6,215,221 B1 | 4/2001 | Cabuz et al. | |
| 6,290,894 B1 | 9/2001 | Raj et al. | |
| 6,490,960 B1 | 12/2002 | Jackson et al. | |
| 6,685,442 B2 | 2/2004 | Chinn et al. | |
| 6,702,301 B1 | 3/2004 | Davies et al. | |
| 6,830,071 B2 | 12/2004 | Xu et al. | |
| 6,939,291 B2 | 9/2005 | Phee Soo Jay | |
| 7,353,747 B2 | 4/2008 | Swayze et al. | |
| 7,484,735 B2 | 2/2009 | Verbrugge et al. | |
| 7,526,856 B2 | 5/2009 | Nikitin | |
| 7,575,807 B1 | 8/2009 | Barvosa-Carter et al. | |
| 7,594,697 B2 | 9/2009 | Browne et al. | |
| 7,673,562 B2 | 3/2010 | Pattekar et al. | |
| 7,755,840 B2 | 7/2010 | Batchko et al. | |
| 7,892,630 B1 | 2/2011 | McKnight et al. | |
| 7,901,524 B1 | 3/2011 | McKnight et al. | |
| 7,905,538 B2 | 3/2011 | Ukpai et al. | |
| 7,909,403 B2 | 3/2011 | Lawall et al. | |
| 7,959,822 B2 | 6/2011 | Oetter et al. | |
| 8,136,875 B2 | 3/2012 | Laake | |
| 8,222,799 B2 | 7/2012 | Polyakov et al. | |
| 8,231,563 B2 | 7/2012 | Mauge et al. | |
| 8,240,677 B2 | 8/2012 | Browne et al. | |
| 8,272,392 B2 | 9/2012 | Pattekar et al. | |
| 8,430,810 B2 | 4/2013 | Hassidov et al. | |
| 8,863,608 B2 | 10/2014 | Fischer et al. | |
| 9,061,118 B2 | 6/2015 | Shoham et al. | |
| 9,308,949 B1 | 4/2016 | Mihelic et al. | |
| 9,580,115 B2 | 2/2017 | Haller | |
| 9,764,113 B2 | 9/2017 | Tuval et al. | |
| 9,790,968 B2 | 10/2017 | Yang et al. | |
| 9,919,418 B2 | 3/2018 | Hashimoto | |
| 9,937,966 B1 | 4/2018 | Yoon et al. | |
| 9,970,564 B2 | 5/2018 | Dankbaar et al. | |
| 10,058,647 B2 | 8/2018 | Roche et al. | |
| 10,224,279 B2 | 3/2019 | Or-Bach et al. | |
| 10,293,718 B1 | 5/2019 | Ilievski et al. | |
| 10,302,586 B2 | 5/2019 | Sun et al. | |
| 10,465,723 B2 | 11/2019 | Ilievski et al. | |
| 10,631,083 B1 | 4/2020 | Gandhi et al. | |
| 10,640,033 B1 | 5/2020 | Gandhi et al. | |
| 10,682,903 B1 | 6/2020 | Gandhi et al. | |
| 10,682,931 B2 | 6/2020 | Rowe et al. | |
| 10,746,206 B1 | 8/2020 | Rowe et al. | |
| 10,749,448 B2 | 8/2020 | Lindsay et al. | |
| 10,797,217 B2 | 10/2020 | Hakkens et al. | |
| 10,946,535 B2 | 3/2021 | Gandhi et al. | |
| 2002/0100888 A1 | 8/2002 | Sharma et al. | |
| 2004/0107829 A1 | 6/2004 | Davis et al. | |
| 2004/0261411 A1 | 12/2004 | MacGregor | |
| 2005/0006020 A1 | 1/2005 | Jose Zitha et al. | |
| 2005/0045480 A1 | 3/2005 | Krumme | |
| 2005/0198904 A1 | 9/2005 | Browne et al. | |
| 2005/0206096 A1 | 9/2005 | Browne et al. | |
| 2006/0032715 A1 | 2/2006 | Barvosa-Carter et al. | |
| 2006/0038745 A1 | 2/2006 | Naksen et al. | |
| 2007/0046074 A1 | 3/2007 | Satta et al. | |
| 2007/0120438 A1 | 5/2007 | Divoux | |
| 2007/0246898 A1 | 10/2007 | Keefe et al. | |
| 2009/0052049 A1 | 2/2009 | Batchko et al. | |
| 2009/0086331 A1 | 4/2009 | Gunasekaran et al. | |
| 2009/0115285 A1 | 5/2009 | Najafi et al. | |
| 2009/0243319 A1 | 10/2009 | Browne et al. | |
| 2009/0255187 A1 | 10/2009 | Alexander et al. | |
| 2010/0090497 A1 | 4/2010 | Beckon | |
| 2010/0258362 A1 | 10/2010 | Trimmer | |
| 2011/0188258 A1 | 8/2011 | Tajima | |
| 2011/0241377 A1 | 10/2011 | Rogers | |
| 2012/0287493 A1 | 11/2012 | Kuhlman et al. | |
| 2012/0292945 A1 | 11/2012 | Nusbaum | |
| 2013/0255815 A1 | 10/2013 | Brinkmann et al. | |
| 2013/0304049 A1 | 11/2013 | Behnke, II et al. | |
| 2013/0318962 A1 | 12/2013 | Joshi et al. | |
| 2014/0109560 A1 | 4/2014 | Ilievski et al. | |
| 2014/0139450 A1 | 5/2014 | Levesque et al. | |
| 2015/0179321 A1 | 6/2015 | Khalil et al. | |
| 2015/0185849 A1 | 7/2015 | Levesque et al. | |
| 2015/0197173 A1 | 7/2015 | Hulway | |
| 2015/0331156 A1 | 11/2015 | Hirsa | |
| 2016/0106620 A1 | 4/2016 | Uno et al. | |
| 2017/0036709 A1 | 2/2017 | Metka et al. | |
| 2017/0080987 A1 | 3/2017 | Morgan | |
| 2017/0150252 A1 | 5/2017 | Trestain et al. | |
| 2017/0225623 A1 | 8/2017 | Gaylard et al. | |
| 2017/0240221 A1 | 8/2017 | Gaylard et al. | |
| 2017/0240223 A1 | 8/2017 | Gaylard et al. | |
| 2017/0240224 A1 | 8/2017 | Gaylard et al. | |
| 2018/0036198 A1 | 2/2018 | Mergl et al. | |
| 2018/0172172 A1 | 6/2018 | Oehler et al. | |
| 2018/0339624 A1 | 11/2018 | Leck | |
| 2019/0023161 A1 | 1/2019 | Sullivan et al. | |
| 2019/0032684 A1 | 1/2019 | Kowalewski et al. | |
| 2019/0044246 A1 | 2/2019 | Pitsillides et al. | |
| 2019/0059608 A1 | 2/2019 | Yan et al. | |
| 2019/0232822 A1 | 8/2019 | Hintermaier | |
| 2019/0296217 A1 | 9/2019 | Jung et al. | |
| 2019/0312193 A1 | 10/2019 | Pelssers et al. | |
| 2019/0322324 A1 | 10/2019 | Hurst | |
| 2019/0326505 A1 | 10/2019 | Pelssers et al. | |
| 2019/0342985 A1 | 11/2019 | Dadheech et al. | |
| 2020/0032822 A1 | 1/2020 | Keplinger et al. | |
| 2020/0066963 A1 | 2/2020 | Johnson et al. | |
| 2020/0130202 A1 | 4/2020 | Gandhi et al. | |
| 2020/0130321 A1 | 4/2020 | Gandhi et al. | |
| 2020/0132213 A1 | 4/2020 | Gandhi et al. | |
| 2020/0132223 A1 | 4/2020 | Prokhorov et al. | |
| 2020/0136525 A1 | 4/2020 | Gandhi et al. | |
| 2020/0136526 A1 | 4/2020 | Gandhi et al. | |
| 2020/0156237 A1 | 5/2020 | Tang et al. | |
| 2020/0156314 A1 | 5/2020 | Rowe et al. | |
| 2020/0180708 A1 | 6/2020 | Khalighi et al. | |
| 2020/0182269 A1 | 6/2020 | Rowe | |
| 2020/0189469 A1 | 6/2020 | Gandhi et al. | |
| 2020/0216121 A1 | 7/2020 | Gandhi et al. | |
| 2020/0238854 A1 | 7/2020 | Gandhi et al. | |
| 2020/0259426 A1 | 8/2020 | Rowe | |

FOREIGN PATENT DOCUMENTS

| | | |
|---|---|---|
| JP | 2007097292 A | 4/2007 |
| KR | 20050056526 A | 6/2005 |
| KR | 10131230 B1 | 9/2013 |

(56) References Cited

FOREIGN PATENT DOCUMENTS

WO    2017077541 A1    5/2017
WO    2018175741 A1    9/2018

OTHER PUBLICATIONS

Yang et al., "Novel Design and Three-Dimensional Printing of Variable Stiffness Robotic Grippers," Dec. 2016, ASME Journal of Mechanisms and Robotics, vol. 8, pp. 061010-1 to 061010-15 (15 pages).
SMC Tech, "Precision Regulator: Series IR1000/2000/3000", SMC Tech, pp. 713-725 and 1-19, 2015 (53 pages).
Ganguly et al., "Field-Assisted Self-Assembly of Superparamagnetic Nanoparticles for Biomedical, MEMS and BioMEMS Applications," Advances in Applied Mechanics, vol. 41, p. 306 (2007).
Collins, "FAQ: What are stacked piezo actuators and what do they do?" Nov. 5, 2015, retrieved from the Internet: <https://www.motioncontroltips.com/faq-what-are-stacked-piezo-actuators-and-what-do-they-do/> (9 pages).

\* cited by examiner

PROGRAMMABLE MATTER

TECHNICAL FIELD

The subject matter described herein generally relates to selectively hardening materials and, more particularly, materials which can achieve a broad variety of specific rigid shapes on demand.

BACKGROUND

Rigid and disposable objects are an everyday part of modern life. The list of disposable wares is long, from disposable spoons and plates for food to disposable tools for putting together furniture. These objects have a short life, take a long time to degrade and require significant energy to dispose of properly. Further, rigid objects such as special purpose tools, can be space wasting, have limited utility, and high cost compared to the said utility. 3D printing seeks to solve some of these deficiencies by making plastic objects on demand. In 3D printing, plastic objects are produced, layer by layer, using a plastic extruding printing device. The printing device can thus convert raw material into a rigid object for single or multiple uses. However, the object created creates the same disposal difficulties as standard disposable devices. Further, once the plastic is extruded by the printing device, it is no longer fit for further 3D printing production.

SUMMARY

Disclosed herein is a programmable material, capable of being formed to and maintaining one or more shapes, and returning to an original amorphous shape. In one embodiment, a reversibly hardenable ferrofluid is disclosed. The reversibly hardenable ferrofluid can include a ferrofluid and a reversible hardening agent dispersed in the ferrofluid. The reversible hardening agent can be capable of repeatably transitioning the ferrofluid between a liquid state and a solid state.

In another embodiment, a magnetic field chamber is disclosed. The magnetic field chamber can include one or more chamber walls, the one or more chamber walls creating a first region. The magnetic field chamber can further include an array of micromagnets positioned in connection with at least one of the one or more chamber walls, the array of micromagnets configured to deliver a magnetic field to the first region, the magnetic field being delivered with variable strength to the first region. The magnetic field chamber can further include a plurality of actuators connected to one or more micromagnets of the array of micromagnets, the plurality of actuators configured to independently actuate the micromagnets with respect to the one or more chamber walls from a first position to a second position. The magnetic field chamber can further include a reservoir configured to receive and dispense a hardenable magnetic substance.

In another embodiment, a field control system for controllably delivering magnetic fields to a ferrofluid is disclosed. The field control system can include a reversibly hardenable ferrofluid, a magnetic field chamber, one or more processors, and a memory communicably coupled to the one or more processors. The memory can include a device input module including instructions that when executed by the one or more processors cause the one or more processors to receive a device input from a user for the reversibly hardenable ferrofluid. The memory can further include a field shaping module including instructions that when executed by the one or more processors cause the one or more processors to provide a magnetic field to the reversibly hardenable ferrofluid in the magnetic field chamber. The memory can further include a shape assignment module including instructions that when executed by the one or more processors cause the one or more processors to harden the reversibly hardenable ferrofluid at the desired shape.

BRIEF DESCRIPTION OF THE DRAWINGS

So that the manner in which the above-recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, wherever possible, to designate identical elements that are common to the figures. Additionally, elements of one embodiment may be advantageously adapted for utilization in other embodiments described herein.

DETAILED DESCRIPTION

To provide context, demand for disposable devices or single-use devices is ever increasing. In general, plastic devices for single purposes, such as cooking, travel or cleaning, are a consistent part of modern society. Further, tools to perform specific functions, matching unique sizes and shapes, are commonly desired and applied. However, availability and space consumptions can be important considerations. The same disposable devices or single-use devices may not be readily available based on circumstance or commonality of their application. In some situations, a specific type of tool may only be available by special order, if at all. In other situations, the circumstances such as natural disasters or special events may have reduced available supply. In these instances, the ability to produce a device based on need from a common source can be advantageous.

To address these issues and others, devices, systems, and methods for producing a ferrodevice structures are disclosed. In one embodiment, a reversibly hardenable ferrofluid is disclosed. The reversibly hardenable ferrofluid can be a magnetic field responsive fluid which can be hardened to a plurality of desired shapes and then relaxed to an amorphous state. In another embodiment, a magnetic field chamber is disclosed. The magnetic field chamber can be a device for containing a ferrofluid, such as the reversibly hardenable ferrofluid, and capable of delivering the magnetic fields in a controllable manner. In another embodiment, a ferrodevice production system is disclosed. The ferrodevice production system can include a reversibly hardenable ferrofluid, a magnetic field chamber, a computing device, and a plurality of modules which interact with components described herein. The embodiments disclosed herein are more clearly described with reference to the figures below.

Figure 1:
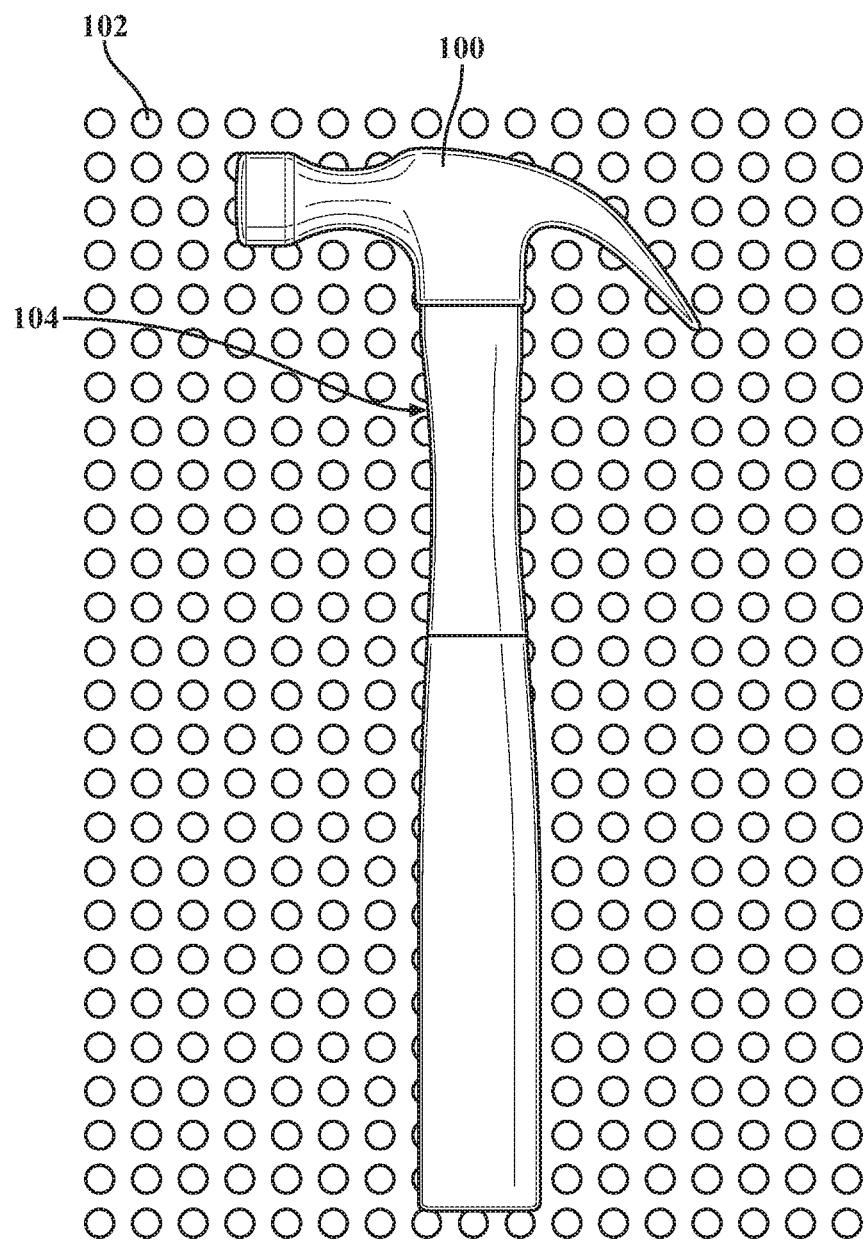
FIG. 1 is a depiction of the programmable material, as programmed by a magnetic field, according to one or more embodiments.

FIG. 1 is a depiction of a reversibly hardenable ferrofluid 100 according to embodiments described herein. The reversibly hardenable ferrofluid 100 can receive a magnetic field from a variety of sources, such as from a magnetic array 102. The reversibly hardenable ferrofluid 100 can transition from 'generic' liquid form, through a controlled magnetic field, to a hardenable shaped form 104. In this example, the hardenable shaped form 104 is the shape of a hammer. In the embodiment shown here, the reversibly hardenable ferrofluid is raised to a temperature such that the reversibly hardenable ferrofluid 100 is in a fluid state. A magnetic field, such as from a magnetic array 102, is controllably delivered to the reversibly hardenable ferrofluid 100 to create a usable form. The magnetic array 102, as shown here, can be an array of permanent magnets, an array of electromagnets, or combinations thereof. The magnetic array 102 can be activated to pull the reversibly hardenable ferrofluid 100 into the desired shape, such as a hammer. Then, the reversibly hardenable ferrofluid 100 can be then solidified into a 'hardened' form, referred to as the hardenable shaped form 104. In some embodiments, the temperature is lowered, such that the shape can harden. In further embodiments, the reversibly hardenable ferrofluid 100 can be responsive to UV radiation exposure, ion bombardment, or other mechanisms of hardening. The hardenable shaped form 104 of the reversibly hardenable ferrofluid 100 can be used for an intended purpose by a user, such as using the hardenable shaped form 104 as a hammer. Once the task is complete, the hardenable shaped form 104 of the reversibly hardenable ferrofluid 100 can be reversed to return the reversibly hardenable ferrofluid 100 to a liquid and reusable state.

Embodiments of the reversibly hardenable ferrofluid 100 described herein employ one or more ferromagnetic fluids. A ferromagnetic fluid (referred to herein, generally speaking, as ferrofluids) is a colloidal suspension of solid ferromagnetic particles in a carrier fluid. Carrier fluids can include fluids capable of supporting the suspension, such as water, kerosene, hydrocarbon or organic solvent, or other. In some embodiments, the ferromagnetic particles can be coated with a stabilizing dispersing agent, such as a surfactant. In the event of a strong magnetic field being applied, the ferromagnetic particles can align with the field and produce a field of their own such that particles tend to agglomerate. The stabilizing dispersing agent can prevent particle agglomeration even when a strong magnetic field gradient is applied to the ferrofluid. These suspensions can be stable and maintain their properties at extreme temperatures and over a long period of time. Though the embodiments described herein are described in the context of ferromagnetic materials, particles, and fluids, any magnetically responsive materials, such as ferrimagnetic materials, can be substituted for ferromagnetic materials in the embodiments described herein. Though described throughout as ferrofluid or ferromagnetic, it is understood that all magnetically responsive fluids are encompassed.

The reversibly hardenable ferrofluid 100 can include magnetic particles, dispersants and an assortment of carriers for ferrofluid compositions. In one embodiment, the magnetic particles are finely divided magnetizable particles. The finely divided magnetizable particles can include materials which are recognized in the art as being magnetic and many similar materials. In another embodiment, the finely divided magnetizable particles can include magnetite, gamma iron oxide, chromium dioxide, ferrites, such as manganese-zinc ferrite, manganese ferrite, nickel ferrite, aluminum nickel cobalt (AlNiCo) alloys, and others. Such materials also include elements and metallic alloys, such as cobalt, iron, nickel, gadolinium, and samarium-cobalt. In further embodiments, the materials are magnetite and gamma iron oxide. The magnetic particles can be present in a ferrofluid composition at a particle size ranging from about 2.0 nm to 30.0 nm in diameter, with the average in particle size being from about 5.0 nm to 10.0 nm in diameter. The magnetic particles can be present, as part of the colloidal dispersion, in up to about 20% by volume of the ferrofluid composition. In one example, the finely divided magnetizable particles are present in from about 2 to 15% by volume of the ferrofluid composition.

The carrier fluid employed in the ferrofluid of the reversibly hardenable ferrofluid 100 can be a liquid which is relatively inexpensive and noncombustible. In one example, the liquid carrier for the initial stages or the preparation of the initial ferrofluid composition is water. The carrier liquid can further include a relatively low viscosity fluid, having a wide temperature range for stability which can include a low pour point and a high flash point, and have a low volatility. A wide variety of fluids can be employed as the carrier fluid in one or more embodiments. Examples of carrier fluids can include aromatic hydrocarbons, aliphatic hydrocarbons, such as toluene, xylene, cyclohexane, heptane, kerosene, mineral oils and others. Carrier fluids can further include halocarbons, such as fluorocarbons which would include the fluorinated and chlorinated ethers, esters and the derivatives of $C_2$-$C_6$ materials, such as perfluorinated polyethers; esters to include polyesters, di- and triesters, such as azealates, phthalates, sebaccates, such as, for example, dioctyl phthalates, di-2 ethylhexyl azealates, silicate esters and the like.

In further embodiments, the carrier liquid for the reversibly hardenable ferrofluid 100 can be paraffins and naphthenes, such as aliphatic and cyclic saturated hydrocarbons, having a boiling point more than about 100° C. The carrier fluids can also be described as being paraffin hydrocarbons (or aliphatic) from about $C_9$-$C_{21}$ and the saturated naphthenic hydrocarbons from about $C_7$-$C_{18}$. All isomeric forms can be used with one or more embodiments described herein, including straight chain, branched, mono-cyclic, bicyclic, and others. Such materials can be available as mixed hydrocarbons, e.g., white oil, or as pure compounds. In one or more embodiments, hydrocarbon mixtures can be used as the carrier fluid.

A dispersant or dispersing agent for the reversibly hardenable ferrofluid 100 can include a wide variety of materials which can aid in the dispersion of the magnetic particles. Such dispersants can be characterized, in one or more embodiments, as surfactants or surface-active agents. Examples of dispersants, usable with one or more embodiments described herein, can include succinates, sulfonates, phosphated alcohols, amine long-chain acid reaction products, phosphate esters, polyether alcohols, polyether acids, and others. Dispersants usable herein can include chemicals which suppress the surface tension of water. Dispersants can have a polar group and a long-chain tail, such as $C_6$-$C_{20}$. The dispersant can be present in the reversibly hardenable ferrofluid 100 compositions in a ratio of surfactant to magnetic particles of about 1:2 to 10:1 by volume; for example, 5:2 by volume, of the solid magnetic particles.

The reversibly hardenable ferrofluid 100 can further include a reversible hardening agent. The reversible hardening agent can be capable of causing the reversibly hardenable ferrofluid 100 to harden or soften by reversible mechanisms, such as based on temperature, reversible polymerization, and others. In one example, the temperature of the reversibly hardenable ferrofluid can be lowered below the melting point of an additive. In another example, the reversibly hardenable ferrofluid can harden by initiating a reversible polymerization. Once hardened, the hardened ferrofluid item can then be removed from the magnetic array to be used. In one example, as described herein, the reversibly hardenable ferrofluid can become a tool, such as a wrench or a hammer. Once the user is finished with the hardened ferrofluid device, the reversibly hardenable ferrofluid can then be returned to the magnetic array or another receptacle for reversal of the hardening process. Thus, the reversibly hardenable ferrofluid can be returned to the original non-hardened, amorphous form for further use.

In one embodiment, the reversible hardening agent can be a reversible Diels-Alder based polymer, such as the Diels-Alder cycloaddition of furan and a maleimide. The crosslinking toughness of the reversible hardening agent can enable the objects to be, for example, used as an equivalent standard object of the same type (e.g., a hammer composed of the reversibly hardenable ferrofluid 100 being used as a hammer). The reversible hardening agent can be low viscosity at high temperature. High temperature refers to temperatures of, for example, from about 100° C. to about 180° C., and such as from about 100° to about 150° C. Low viscosity at a high temperature refers, for example, to a viscosity of from about one (1) to about 20 centipoises, and such as from about two (2) to about five (5) centipoises. Low, or room, temperature refers to a temperature of from about 10° to about 40° C., and such as from about 15° to about 30° C.

In one embodiment, the reversible hardening agent can be generated by a reversible crosslinking reaction between pendant furan and maleimide groups. The basic chemistry is a reversible equilibrium referred to as Diels-Alder cycloaddition whereby furan and maleimide react to form an adduct at a temperature in the range of about 10° C., to about 50° C. The above-described adduct can be reversible at temperatures in the range of about 80° C. to about 200° C. to the furan and maleimide reactants. The reaction is summarized in the following scheme:

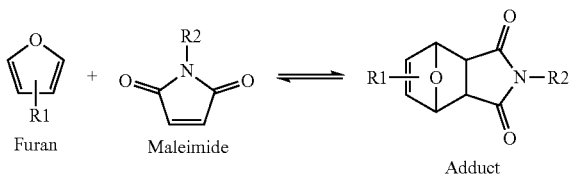

Furan   Maleimide                    Adduct

The adduct can be comprised of several isomers, for example exo, endo and diastereomers, any of which function as a crosslinker. When R1 and R2 are oligomers with an average of from about 1 to 10, and such as from about 2 to 5 furan or maleimide groups, this chemistry can cause reversible crosslinking of the polymer or oligomer. Examples of R1 and R2 are aryl, linear and branched hydrocarbons, poly(ethylene oxide), poly(propylene oxide), condensation polymers, and the like. Examples of the linear aliphatics include those with from about one (1) to about 40 carbons, as in $(CH_2)_n$ where n is from one (1) to about 40, such as methylene, ethylene, propylene, butylene and the like. Examples of branched aliphatics are isopropyl, isobutyl, sec-butyl, 2-methylpentyl, neopentyl, 2-ethylhexyl, 2-ethyloctyl, and the like. Examples of aryl include those groups or substituents with from six (6) to about 30 carbon atoms, such as phenyl, tolyl, xylyl, biphenyl, naphthyl, and the like, ring substituted aryl groups with methyl, methoxy, carboxyl, chloro, bromo, and the like.

In another embodiment, the reversible hardening agent can be a lipid constituent. The lipid constituent can be a solid lipid at room temperature. Solid lipids, as used herein, can be of predominantly anisometrical shape. Solid lipids can include lipids with a lipid matrix being present in a β-polymorphic modification (e.g. β', β1, β2) or in a polymorphic state analogous to that of β-crystals of triglycerides and not in an amorphous or α-crystalline-like state. The solid lipids can be solid at room temperature and have melting points ranging from approximately 40° C. to 120° C. The solid lipids can include long-chain fatty acids, hydrogenated vegetable oils, fatty acids and their esters, fatty alcohols and their esters and ethers. The solid lipids can further include natural or synthetic waxes such as beeswax and carnauba wax, wax alcohols and their esters, sterols such as cholesterol and its esters, hard paraffins, and combinations thereof.

Lipids are known to show significant polymorphism, which can be defined as the ability to express different unit cell structures in the crystal. This polymorphism can result from different molecular conformation and molecular stacking. Depending on the conditions, for example, glycerides can crystallize in three different polymorphic forms called alpha (α), beta prime (β') and beta (β). These polymorphic modifications characterized by a specific packing of the carbon chain can differ greatly in terms of properties such as solubility, melting point, and thermal stability. The transformation takes place from α to β' to β, and the transition is monotonic. The β-form is the most stable polymorph, thermodynamically, and a exhibits low stability. The α-form is transformed into β' and β polymorphs, more or less rapidly. The β' and β polymorphs are more stable, depending on the thermal conditions. In some embodiments, the lipid matrix may be predominantly present as a stable polymorph.

In addition to reversible hardening agents being added to the reversibly hardenable ferrofluid 100, strengthening agents can also be added to the ferrofluid suspension. Strengthening agents can remain largely in solution or suspension while adding to the rigidity of the hardened form. Strengthening agents can include materials such as soluble polymers, polymers which form a colloidal suspension, insoluble metal wires in suspension, carbon or silicon nanotubes or others. Alternatively, or additionally, anti-wear agents can be added to the ferrofluid suspension. Anti-wear agents can include metal and ceramic powders, which can improve the mechanical properties of the items formed.

Thus, the reversibly hardenable ferrofluid 100 can provide a variety of benefits to an end user. The reversibly hardenable ferrofluid 100 can change into multiple shapes, thus saving space for the user. Further, the reversibly hardenable ferrofluid 100 can create an object or device on command, providing immediate access to the user. Finally, the reversibly hardenable ferrofluid 100 can produce novel objects, thus fulfilling an emergent need for the user. Novel objects, as used herein, refers to objects that are designed by the user, either based on preexisting objects or completely without external input. Novel objects can be provided through description or input from a drawing program.

Figure 2A:
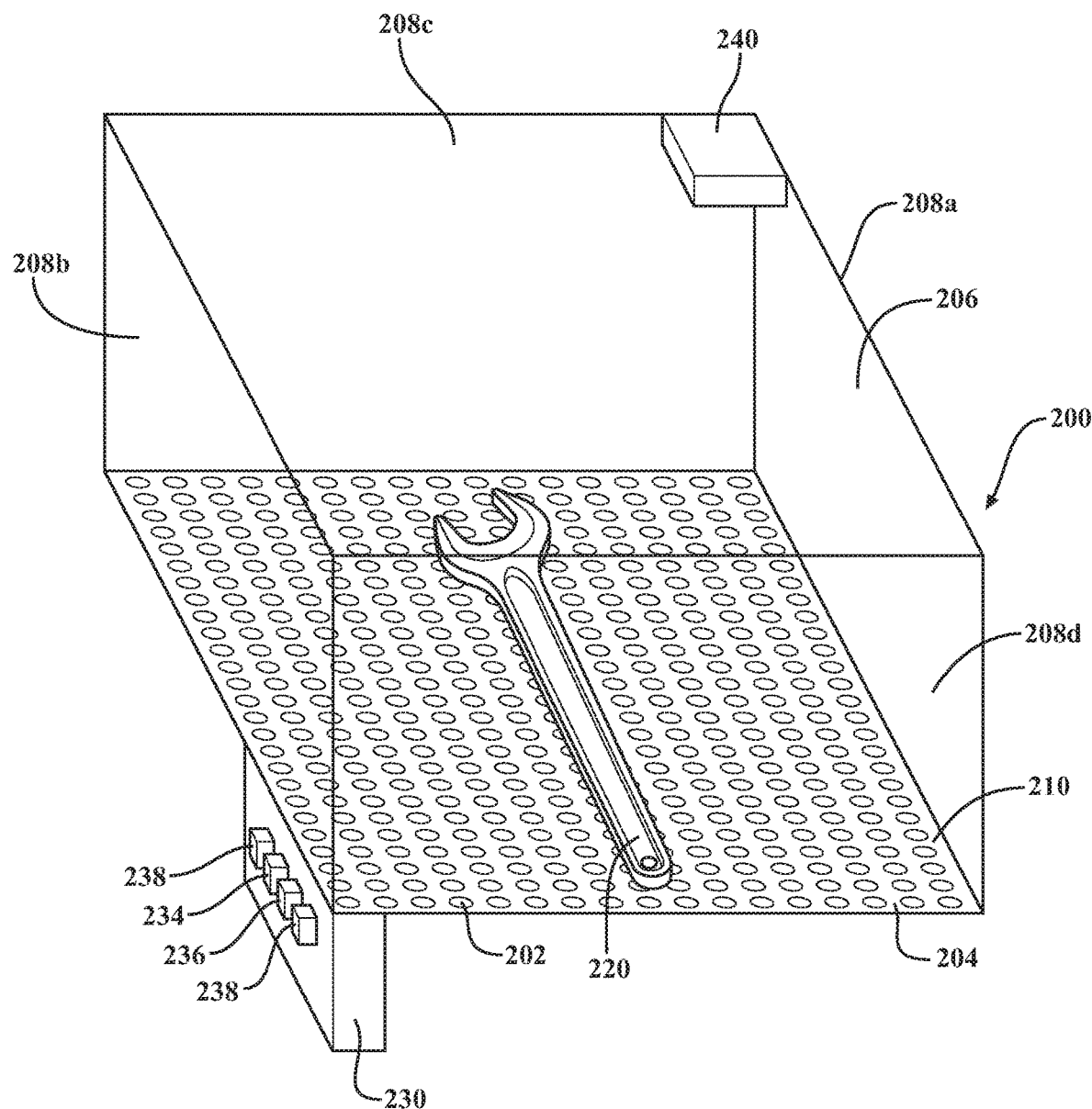
FIGS. 2A and 2B are illustrations of a magnetic field chamber, according to one or more embodiments.
Figure 2B:
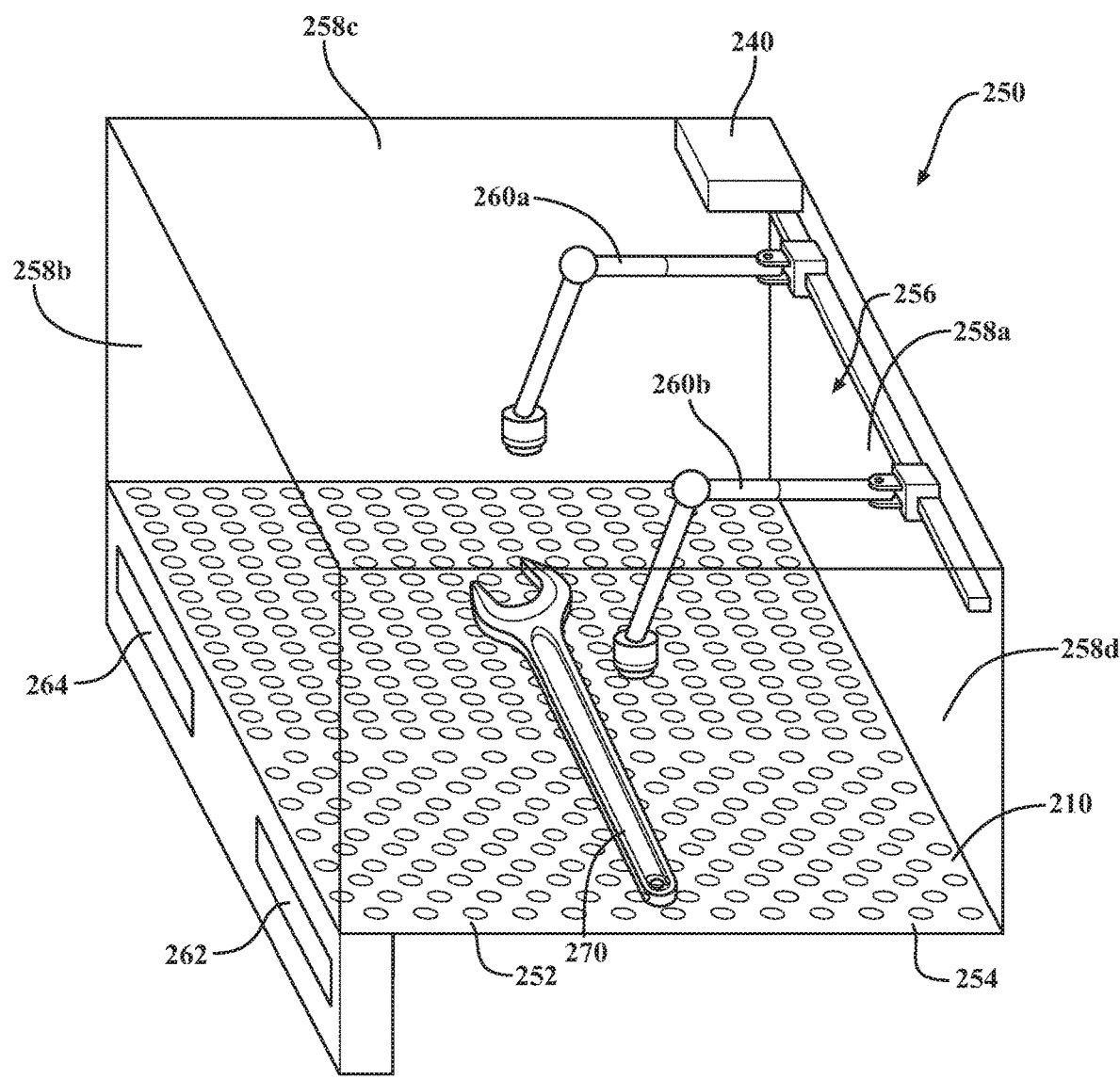

FIGS. 2A and 2B are illustrations of the magnetic field chamber, according to one or more embodiments. One or more embodiments herein relate to magnetic field chambers and devices for delivering a controllable magnetic field. The magnetic field chambers described herein can be composed of a variety of materials, such as a glass and/or metals. In embodiments described herein, the magnetic field chamber can comprise metals (e.g., steel, aluminum), glass, ceramics (e.g., $Al_2O_3$), plastics, or others. Though components of the magnetic field chambers in FIGS. 2A and 2B are described with reference to their respective magnetic field chamber, it is understood that components of each chamber can be applied to either chamber, without further explicit recitation herein.

FIG. 2A depicts the magnetic field chamber 200, according to one or more embodiments. The magnetic field chamber 200 can provide a magnetic field with controllable direction and intensity. In one embodiment, the magnetic field chamber 200 can be applied to create shapes in the magnetic field through the use of plurality of variable micromagnets 202. Shown here, the variable micromagnets 202 can be actuated to one or more positions between a first height and a second height. In particular, plurality of variable micromagnets 202 may be incorporated into one or more walls of the magnetic field chamber 200. In one example, the plurality of variable micromagnets 202 can be incorporated using individualized electrical wiring, individualized to one or more of the plurality of variable micromagnets 202. The electrical wiring can be connected through a control system to power the individualized wiring for each of the plurality of variable micromagnets 202. The plurality of variable micromagnets 202 may be positioned such that the plurality of variable micromagnets 202 form a pixelated electromagnet array. Applications can include the formation of a magnetic field of a particular shape, with varying magnetic field intensity. The plurality of variable micromagnets 202 may be movable or stationary. When movable, the plurality of variable micromagnets 202 can have any type of motion, such as linear, rotational, and/or hemispherical. Further, the plurality of variable micromagnets 202 can vary independently in magnetic field intensity.

The plurality of variable micromagnets 202 can be positioned at varying points throughout the magnetic field chamber 200 for localized magnetic field control. In one embodiment, the magnetic field chamber 200 includes an array of variable micromagnets 202 positioned on a floor 204, a ceiling 206, and side walls 208a, 208b, 208c, and 208d. Each of the variable micromagnets 202 can be positioned with a standard spacing. The size of the variable micromagnets 202 can be reduced, such that the magnetic fields can be delivered with greater precision. Further, the variable micromagnets 202 for each of the floor 204, the ceiling 206, and the side walls 208a, 208b, 208c, and 208d can be movable, including being independently movable. In one embodiment, the plurality of variable micromagnets 202 can each be attached to an independent actuator, such that the plurality of variable micromagnets 202 can be independently moved from a first position to a second position in the chamber. As the plurality of variable micromagnets 202 is actuated, they can deliver their respective magnetic fields to the reversibly hardenable ferrofluid 220. The reversibly hardenable ferrofluid 220 can be substantially similar to the reversibly hardenable ferrofluid 100 described with reference to FIG. 1.

In further embodiments, a membrane 210 can cover one or more surfaces of the magnetic field chamber 200. As the reversibly hardenable ferrofluid 100 can be in a fluid form in one or more embodiments, said fluids can move into spaces formed between the plurality of variable micromagnets 202. This flow of the reversibly hardenable ferrofluid can be undesired. As such, a fluid-impermeable membrane 210 can be used to allow for delivery of the magnetic field without contact with the reversibly hardenable ferrofluid. The membrane 210 can include an elastomeric polymer (elastomer). The use of a plurality of different encapsulating elastomers of varying degrees of softness and hardness can be employed. The elastomers may be natural or synthetic. Examples of elastomers usable as part of the membrane 210 can include nitrile, ethylene propylene diene monomer (EPDM), fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof.

In further embodiments, the magnetic field chamber 200 can further include a reservoir 230. The reservoir 230 is a fluid-impermeable element, such as a container, that can be capable of or configured to receive and transfer the reversibly hardenable ferrofluid 220. The reservoir 230 can be made from materials as described for the magnetic field chamber 200. Further, the reservoir 230 can be in fluid connection with the magnetic field chamber 200, such as for receiving and transmitting the reversibly hardenable ferrofluid 220. The reservoir 230 can include further components which assist or benefit the transfer of the reversibly hardenable ferrofluid 220 including a vacuum source 232, a heating source 234, a cooling source 236, and a pressure source 238. The vacuum source 232 can remove one or more gases to create a vacuum in the reservoir 230, such as to suction in the reversibly hardenable ferrofluid 220. In one embodiment, the reservoir 230 can be defined by the floor 204, the ceiling 206, the side walls 208a, 208b, 208c and 208d, combinations thereof, or portions thereof, such that the reservoir 230 is within the processing region of the magnetic field chamber 200. The heating source 234 can heat the reservoir 230 or the contents thereof, such as to convert the reversibly hardenable ferrofluid 220 to a liquid state. The cooling source 236 can cool the reservoir 230 or the contents thereof, such as to convert the reversibly hardenable ferrofluid 220 to a solid state or to assist in pressure control in the reservoir 230. The pressure source 238 can deliver one or more gases to create pressure in the reservoir 230, such as to expel the reversibly hardenable ferrofluid 220 from the reservoir 230.

FIG. 2B depicts the magnetic field chamber 250, according to further embodiments herein. Referring to FIG. 2B, the magnetic field chamber 250 can have a plurality of variable micromagnets 252 disposed in a heating/cooling base 254. In one embodiment, the magnetic field chamber 250 includes a heating/cooling base 254, a ceiling 256, and side walls 258a, 258b, 258c, and 258d. Any suitable arrangement may be made for the inclusion of the plurality of variable micromagnets 252. In one such example, a layout of the plurality of variable micromagnets 252, which can be arranged, symmetrically or asymmetrically, delivers between 25 to 500 independent micromagnets on the back of the heating/cooling base 254. Although a very specific asymmetrical pattern is depicted in FIG. 2B for illustrative purposes, other embodiments include an entirely symmetrical pattern. In the latter case, the pattern depicted in FIG. 2B can instead be used to depict only those variable micromagnets 252 that are active at a particular time in a processing operation. In another exemplary embodiment of a symmetrical arrangement, seventy-two (72) variable micromagnets 252 are evenly distributed in the heating/cooling base 254. Thus, it is to be understood that FIG. 2B illustrates only one of many possibilities of total included variable micromagnets 252, or a subset of activated variable micromagnets 252 having a specific application.

The heating/cooling base 254 can include one or more heating and/or cooling elements, depicted here as heating element 262 and cooling element 264. Shown here, the reversibly hardenable ferrofluid 270 is positioned on the heating/cooling base 254 and in the shape of a wrench. The heating element 262 and the cooling element 264 can provide temperature control during the shaping of the reversibly hardenable ferrofluid 270, while the plurality of variable micromagnets 252 controls the shape with the applied magnetic fields, as described above with reference to FIG. 2A. In further embodiments, the heating/cooling base 254 can include a plurality of the heating element 262 and/or the cooling element 264, such as four (4) heating elements 262 and four (4) cooling elements 264. In one embodiment, the heating elements 262 are a resistive heating element capable of heating in the presence of an electric charge. In another embodiment, the cooling elements 264 are a liquid cooling device which is configured to deliver a coolant to the base or other surface and transfer heat accordingly.

The magnetic field chamber 250 can further include one or more robotic arms 260, depicted here as robotic arms 260a and 260b. The robotic arms 260 can be more or fewer than depicted here. As shown here, the robotic arms 260a and 260b can provide precise magnetic fields to the reversibly hardenable ferrofluid 270. The robotic arms 260a and 260b can be connected with the ceiling 256, and/or the side walls 258a, 258b, 258c and 258d, such that the robotic arms 260a and 260b can reach a variety of angles desired for shaping the reversibly hardenable ferrofluid 270. In one embodiment, the robotic arms 260a and 260b are positioned such that the correct the delivery of one or more magnetic fields from the variable micromagnets 252 of the heating/cooling base 254.

Some embodiments involve the incorporation of the plurality of variable micromagnets 252 as embedded in a chamber wall and attached to one or more robotic arms for independent and local magnetic field control. In another embodiment, magnetic field chamber designs described herein include arrangements of electromagnets either embedded in or surrounding a periphery of the magnetic field chamber. Magnetic field chamber described herein may be available to integrate with a local heating or cooling elements, such as the heating/cooling base 254 which leads to processing controls using thermal and magnetic mechanisms.

In further embodiments, the magnetic field chambers 200 and 250 can further include a sensor system 240, which can include one or more sensors. The term "sensor," as used herein, relates to any device, component and/or system that can detect, and/or sense something. The one or more sensors can be capable of or configured to detect, and/or sense in real-time. As used herein, the phrase "real-time" refers to a process in which a user or system immediately detects a particular process or decision to be made, or allows the processor to catch up with an external process. In configurations where the sensor system 240 includes multiple sensors, the sensors can operate independently of one another. Alternatively, two or more sensors may be used in combination with each other. In this way, two or more sensors can form a sensor array. The sensor system 240 may include any suitable type of sensor. Various examples of different types of sensors are described here. However, the embodiments are not limited to the specific sensors described, and the description herein may lend itself to equally effective embodiments.

The sensor system 240 can detect, determine, and/or sense information about the magnetic field chambers 200 and 250 themselves or components therein. In one or more embodiments, the sensor system 240 can be configured to detect, and/or sense shape, temperatures, viscosity, position, and orientation changes of components of the magnetic field chambers 200 and 250 and/or a reversibly hardenable ferrofluid. In one or more embodiments, the sensor system 240 can include one or more accelerometers, one or more gyroscopes, an inertial measurement unit (IMU), high dynamic range (HDR) cameras, infrared (IR) cameras, ultrasound sensors, thermometers, pressure sensors, and/or other suitable sensors. In one embodiment, the sensor system 240 include one or more cameras disposed within in proximity to the magnetic field chamber for determining change in shape of the reversibly hardenable ferrofluid.

In operation, the magnetic field chamber 250 can receive and input regarding an object to be created. The magnetic field chamber 250 can then receive at least a portion of the reversibly hardenable ferrofluid 270 from a source, such as from the reservoir 230, described with reference to FIG. 2A. The reversibly hardenable ferrofluid 270 can then be heated to a liquid temperature by the heating/cooling base 254. One or more of the variable micromagnets 252, such as those located in the heating/cooling base 254, the ceiling 256, the side walls 258a, 258b, 258c and 258d, and/or the robotic arms 260a and 260b, can then deliver a magnetic field to the magnetic field chamber 250. The magnetic field can cause the reversibly hardenable ferrofluid 270 to achieve a desired shape, shown here as a wrench. The heating/cooling base 254 can then cool the reversibly hardenable ferrofluid 270 to a solidifying temperature, causing the reversibly hardenable ferrofluid 270 to harden into a solid. Once solid, the reversibly hardenable ferrofluid 270 can be used for the intended purpose of said device, such as a wrench being used to tighten a bolt. In some instances, the reversibly hardenable ferrofluid 270 can be subsequently returned to the magnetic field chamber 250 where the reversibly hardenable ferrofluid 270 is returned to a liquid state and stored for later use.

Thus, the magnetic field chambers described herein provide various advantages. This configuration provides a plurality of pixelated micromagnet with independent control of magnetic field strength and polarity. Controllability can be on the millimeter scale or less and can be limited only by the size of the electromagnet. In this way, the reversibly hardenable ferrofluid can be controlled with greater precision, and it is, therefore, possible to form a more broadly useful device. Likewise, the magnetic field chamber can control the hardening of the reversibly curable ferrofluid and can rapidly produce one or more devices, in rapid succession.

Figure 3:
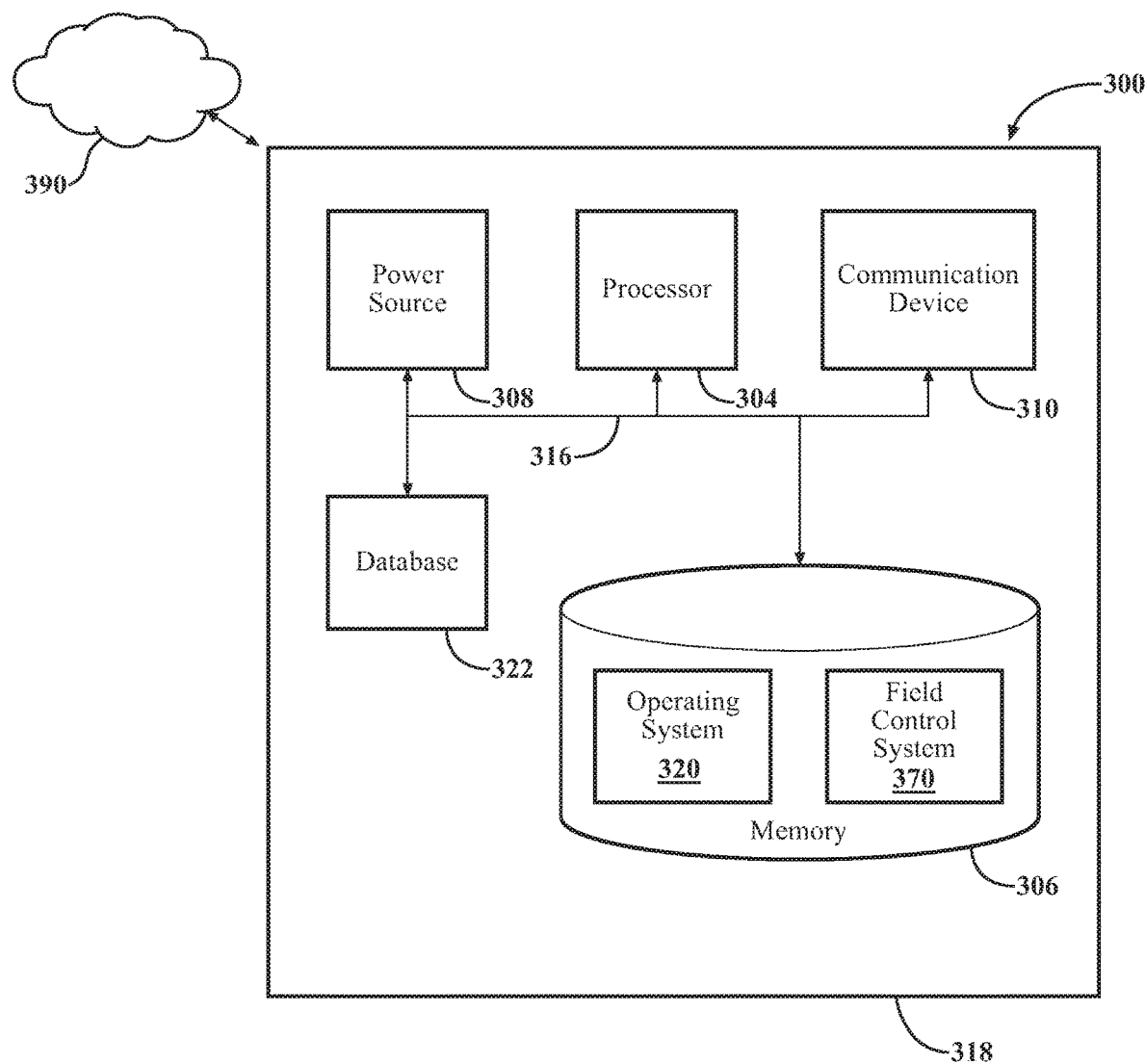
FIG. 3 is a computing device adaptable for use with embodiments described herein.

FIG. 3 is a block diagram of the computing device 300 usable with the reversibly hardenable ferrofluid described above, according to one or more embodiments. The computing device 300 can be any appropriate type of computing device such as, but not limited to, a server, a personal computer (PC), workstation, embedded computer, or stand-alone device with a computational unit, such as a microprocessor, DSP (digital signal processor), FPGA (field programmable gate array), or ASIC (application-specific integrated circuit), or others. The computing device 300 can contain various components for performing the functions that are assigned to the said computing device. The components can include a processor 304, like a central processing unit (CPU), a memory 306, a power source 308, communications device 310, input and/or output devices, and at least one bus 316 that connects the components above. In some embodiments, these components are at least partially housed within a housing 318.

The processor 304, which can also referred to as a CPU, can be a device which is capable of receiving and executing one or more instructions to perform a task as part of a computing device. In one embodiment, the processor 304 can include a microprocessor such as an application-specific instruction set processor (ASIP), graphics processing unit (GPU), a physics processing unit (PPU), a DSP, an image processor, a co-processor, or others. Though referenced as the processor 304, it is understood that one or more processors 304 can be used in one or more embodiments described herein, including combinations of processors 304.

The memory 306 can be any hardware capable of storing data or information. Examples of data or information that can be stored in the memory 306 include data, program code in functional form, and/or other appropriate information, either temporary and/or permanent, but not limited thereto. The memory 306, when executed by the processor 304, may include one or more modules including computer-readable instructions that cause the processor 304 to perform the methods and functions described herein. The memory 306 can include volatile and/or non-volatile memory. The memory 306 can further include a computer-readable storage medium. Examples of suitable memory 306 include RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

The memory 306 can be a component of the processor(s) 304, or the memory 306 can be operably connected to the processor(s) 304 for use thereby. The memory 306 can include an operating system 320, such as LINUX. The operating system 320 can include batch, live, time-sharing, real-time, and other types of operating systems. The operating system 320, as described herein, can include instructions for processing, accessing, writing, storing, searching data, or other functions as selected by the user for controlling and providing an interface with the computing device 300. The memory 306 can include communications procedures for communicating with the network 390, a magnetic device for providing a magnetic field to the reversibly hardenable ferrofluid 100, and/or another computing device.

The communication device 310 can be wired or wireless connection components and/or software allowing the computing device 300 to communicate with other computing devices. The communication device 310 can allow communication with devices either locally or remotely, such as over a network protocol (e.g., Ethernet or similar protocols). In one example, the computing device 300 is connected to the network 390 using the communication device 310. The communication device 310 can further be connected with remote devices associated with other computing devices. In further embodiments, the computing device 300 can connect with one or more computing devices, allowing access to one or more sensors, which are connected to or in connection with the second computing device.

The computing device 300 can further include a field control system 370 or components thereof. As described herein, certain components of the field control system 370 can be stored in in the computing device 300 or in combinations thereof. As such, one or more embodiments of the field control system 370 can include the field control system 370, modules thereof, or components thereof as being stored, collected, created, compared or otherwise made available from the memory 306 or the database 322 of the computing device 300. When stored as part of the computing device 300, the field control system 370 can access the reversibly hardenable ferrofluid 100, another computing device 300, or other devices through the communications device 310 and the network 390, allowing for continuity between the one or more components which comprise the field control system 370.

Figure 4:
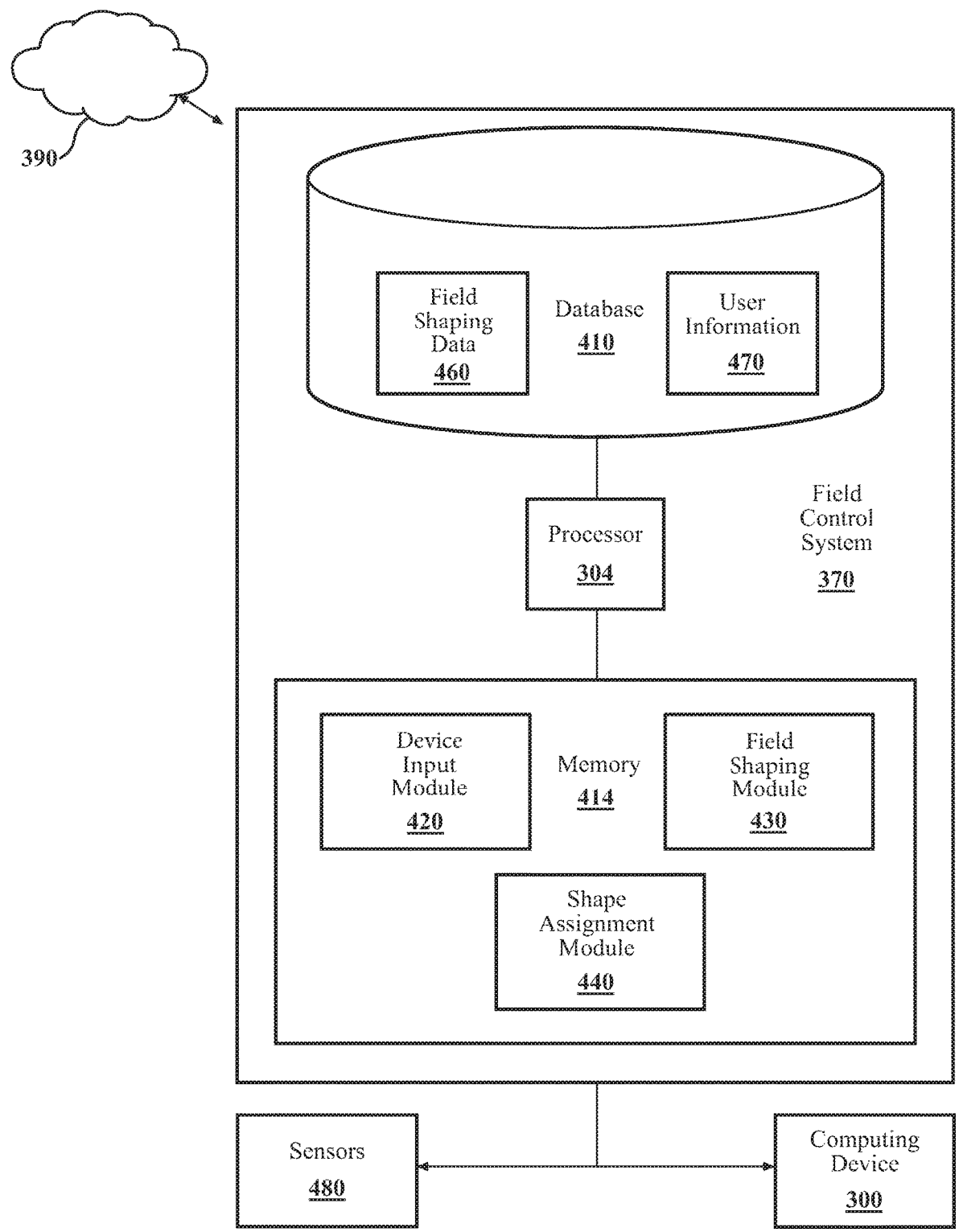
FIG. 4 is a surface control system for the magnetic field chamber and the programmable material, according to one embodiment.

The discussion of the field control system 370 begins at FIG. 4, with an illustration of the field control system 370, according to one embodiment. The field control system 370 is shown as including the processor 304 from the computing device 300, depicted in FIG. 3. Accordingly, the processor 304 can be a part of the field control system 370, the field control system 370 can include a separate processor from the processor 304 or the field control system 370 can access the processor 304 through a data bus or another communication path. In one embodiment, the field control system 370 includes the memory 414 that stores a device input module 420, a field shaping module 430 and a shape assignment module 440. The memory 414 is a RAM, a ROM, a hard disk drive, a flash memory, or other suitable memory for storing the modules 420, 430, and 440. The modules 420, 430, and 440 are, for example, computer-readable instructions that when executed by the processor 304, cause the processor 304 to perform the various functions disclosed herein.

The field control system 370 can further include a database 410. The database 410 can be presented in a number of configurations, including as part of the memory 414, as an independent component from the memory 414, as part of a separate memory (distinct from memory 414), or others. The database 410 can include field shaping data 460 and user information 470. The field shaping data 460 can include data sets regarding field shaping for the reversibly hardenable ferrofluid including responsiveness at specific temperature, curie effect, desired shape, current shape, actuation at the micromagnets and other details which can be used to control the reversibly hardenable ferrofluid during shaping. The user information 470 can include information related to selections for and uses of the reversibly hardenable ferrofluid by a user. The field control system 370 or portions thereof, can be stored as part of the computing device 300, as part of a server, or others. As such, one or more of the functions of the field control system 370 or of the modules contained therein, can be performed remotely and transferred to a magnetic field chamber for the reversibly hardenable ferrofluid as part of the embodiments described herein. The field shaping data 460 can further include a library of pre-defined shapes which are selectable by the user.

The device input module 420 can generally include instructions that function to control the processor 304 to receive a device input from a user for the reversibly hardenable ferrofluid. The device input is a signal or selection from a user regarding an object which the user intends to form with the reversibly hardenable ferrofluid. The reversibly hardenable ferrofluid, as used herein, can be substantially similar to the reversibly hardenable ferrofluid described with reference to FIGS. 1-2B. The device input can be delivered to the device input module 420 based on the modulation of a switch, selection from a touch screen, delivery of voice commands, or other forms of user communication with a device. The device input can be received directly by the device input module 420 or through a network, such as the network 390. The device input can further include individualized input or selection from pre-existing options regarding one or more objects which can be created from the reversibly hardenable ferrofluid. In another embodiment, the device input is a signal delivered by the user indicating the desire to created a pre-selected object from the reversibly hardenable ferrofluid, according to embodiments described herein. The device input can be stored as part of the user information 470 in the database 410.

The field shaping module 430 can generally include instructions that function to control the processor 304 to provide a magnetic field to the reversibly hardenable ferrofluid in the magnetic field chamber. The magnetic field chamber can be substantially similar to the magnetic field chambers, described with reference to FIGS. 2A and 2B. The magnetic field can be delivered to the reversibly hardenable ferrofluid in a substantially similar manner to that which is described with reference to FIGS. 2A and 2B. The magnetic field can be delivered independently through each micromagnet of the array of micromagnets. Independently, in this context, refers to the capability of the micromagnets to move independently of one another and to deliver a magnetic field of an independent shape and intensity from one another. In one embodiment, a first micromagnet delivers a magnetic field with a first shape and intensity from a first position, while a second electromagnet delivers a magnetic field with a second shape and intensity from a second position. The magnetic field can be configured such that a specific shape is created in the ferrofluid without direct contact with the micromagnet. In this way, the shape of the reversibly hardenable ferrofluid can be controlled while in a liquid state.

The field shaping module 430 can further include instructions to control the delivery of the reversibly hardenable ferrofluid to the magnetic field chamber. In one or more embodiments, the field control system 370 can include a reservoir or other storage source for the reversibly hardenable ferrofluid. The field shaping module 430 can provide an input to a chamber or reservoir to deliver a measured quantity of the reversibly hardenable ferrofluid to the magnetic field chamber. In one embodiment, a reservoir is in fluid connection with the magnetic field chamber. The reservoir can then receive instructions from the field shaping module 430 to deliver a specific quantity of the reversibly hardenable ferrofluid to the magnetic field chamber. The reservoir can then raise the temperature of the reversibly hardenable ferrofluid to a liquid temperature or otherwise prepare the reversibly hardenable ferrofluid for low viscosity flow to the magnetic field chamber. Once ready for flowing, the reservoir can apply a pressure, such as from a gas or an actuator, to flow the reversibly hardenable ferrofluid into the magnetic field chamber. In some embodiments, such as embodiments which employ a reversible UV cure or chemical cure, the reversibly hardenable ferrofluid can simply be delivered to the magnetic field chamber.

The shape assignment module 440 can generally include instructions that function to control the processor 304 to harden the reversibly hardenable ferrofluid at a desired shape. The shape assignment module 440 can include instructions to determine the if the final shape of the object has been achieved. In one or more embodiments, the final shape can be determined through the use of one or more sensors 480. The one or more sensors 480 can include sensors and/or perform functions which are substantially similar to the sensor system 240, described above with reference to FIGS. 2A and 2B. Once the appropriate shape has been reached, the shape assignment module 440 can cure the reversibly hardenable ferrofluid in the current shape. The curing process can include UV irradiation, delivery of a chemical curing agent, change in temperature (heating or cooling), or others. The curing process can be substantially similar to that which is described for the reversibly hardenable ferrofluid 100, described with reference to FIG. 1. At this point, the reversibly hardenable ferrofluid can be used to perform a specified task.

The shape assignment module 440 can further include instructions to reverse the cure of the reversibly hardenable ferrofluid. Once the reversibly hardened ferrofluid has served the designated task, the reversibly hardenable ferrofluid can then be returned to the magnetic field chamber. The shape assignment module 440 can detect, receive notification or otherwise be informed that the reversibly hardenable ferrofluid had been returned to the magnetic field chamber. The shape assignment module 440 can then provide the appropriate input to reverse the curing process and return the reversibly hardenable ferrofluid to a liquid state. In one embodiment, the reversibly hardenable ferrofluid can be made liquid by heat to reverse the polymerization or solidification. Once liquified, the shape assignment module 440 can instruct the reservoir to extract the reversibly hardenable ferrofluid from the magnetic field chamber, as described above.

Thus the field control system 370 and the magnetic field chamber can regulate the movement of the reversibly hardenable ferrofluid. The reversibly hardenable ferrofluid can change from a first shape to a second shape, and each shape can be held by the reversible cure described herein, such that the shape no longer requires external forces to be maintained. The reversibly hardenable ferrofluid can provide numerous benefits. The reversibly hardenable ferrofluid can assist in space conservation, by performing as multiple standard objects, on demand, while requiring minimal space for storage or holding. Further, the reversibly hardenable ferrofluid can replace numerous devices which have become standard in vehicles and households, allowing for a variety of applications. The field control system 370 can add a level of modulation to the reversibly hardenable ferrofluid, allowing the reversibly hardenable ferrofluid to be intelligently controlled.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which can include one or more executable instructions for implementing the specified logical function(s). It should also be noted that, in some alternative embodiments, the functions noted in the block can occur out of the order noted in the figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which can include all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. A magnetic field chamber, comprising:
one or more chamber walls, the one or more chamber walls creating a first region;
an array of micromagnets positioned in connection with at least one of the one or more chamber walls, the array of micromagnets configured to deliver a magnetic field to the first region, the magnetic field being delivered with variable strength to the first region;
a plurality of actuators connected to one or more micromagnets of the array of micromagnets, the plurality of actuators configured to independently actuate the micromagnets with respect to the one or more chamber walls from a first position to a second position;
a hardenable magnetic substance; and
a reservoir configured to receive and dispense the hardenable magnetic substance.

2. The magnetic field chamber of claim 1, wherein the hardenable magnetic substance further comprises a reversible hardening agent dispersed in a ferrofluid, the reversible hardening agent being capable of repeatably transitioning the ferrofluid between a liquid state and a solid state.

3. A magnetic field chamber, comprising:
one or more chamber walls, the one or more chamber walls creating a first region;
an array of micromagnets positioned in connection with at least one of the one or more chamber walls, the array of micromagnets configured to deliver a magnetic field to the first region, the magnetic field being delivered with variable strength to the first region;
a plurality of actuators connected to one or more micromagnets of the array of micromagnets, the plurality of actuators configured to independently actuate the micromagnets with respect to the one or more chamber walls from a first position to a second position;
a reservoir configured to receive and dispense a hardenable magnetic substance; and
one or more robotic arms, the robotic arms having at least one micromagnet.

4. The magnetic field chamber of claim 1, wherein the one or more chamber walls comprise a base and a plurality of side walls, the base having one or more heating elements and one or more cooling elements.

5. The magnetic field chamber of claim 4, further comprising a membrane formed over the base.

6. The magnetic field chamber of claim 4, wherein the array of micromagnets are positioned on the base and at least one of the plurality of side walls.

7. The magnetic field chamber of claim 1, wherein the array of micromagnets are independent electromagnets.

8. A field control system for controllably delivering magnetic fields to a ferrofluid, comprising:
a reversibly hardenable ferrofluid;
a magnetic field chamber, the magnetic field chamber including:
one or more chamber walls, the one or more chamber walls creating a first region;
an array of micromagnets positioned in connection with at least one of the one or more chamber walls, the array of micromagnets configured to deliver a magnetic field to the first region, the magnetic field being delivered with variable strength to the first region;
a plurality of actuators connected to one or more micromagnets of the array of micromagnets, the plurality of actuators configured to independently actuate the micromagnets with respect to the one or more chamber walls from a first position to a second position; and
a reservoir configured to receive and dispense the reversibly hardenable ferrofluid;
one or more processors; and
a memory communicably coupled to the one or more processors and storing:
a device input module including instructions that when executed by the one or more processors cause the one or more processors to receive a device input from a user for the reversibly hardenable ferrofluid;
a field shaping module including instructions that when executed by the one or more processors cause array of micromagnets to provide a magnetic field to the reversibly hardenable ferrofluid in the magnetic field chamber; and
a shape assignment module including instructions that when executed by the one or more processors cause the one or more processors to harden the reversibly hardenable ferrofluid at a desired shape.

9. The field control system of claim 8, wherein the reversibly hardenable ferrofluid comprises:
a ferrofluid; and
a reversible hardening agent dispersed in the ferrofluid, the reversible hardening agent being capable of repeatably transitioning the ferrofluid between a liquid state and a solid state.

10. The field control system of claim 8, wherein the device input module further includes instructions to receive a novel input as the device input.

11. The field control system of claim 8, wherein the device input module further includes instructions to receive voice commands.

12. The field control system of claim 8, wherein the field shaping module further includes instructions to deliver the reversibly hardenable ferrofluid to the magnetic field chamber from a reservoir.

13. A field control system for controllably delivering magnetic fields to a ferrofluid, comprising:
a magnetic field chamber, the magnetic field chamber including:
one or more chamber walls, the one or more chamber walls creating a first region;
an array of micromagnets positioned in connection with at least one of the one or more chamber walls, the array of micromagnets configured to deliver a magnetic field to the first region, the magnetic field being delivered with variable strength to the first region;
a plurality of actuators;
connected to one or more micromagnets of the array of micromagnets, the plurality of actuators configured to independently actuate the micromagnets with respect to the one or more chamber walls from a first position to a second position;
a reservoir configured to receive and dispense a reversibly hardenable ferrofluid; and
one or more robotic arms, the robotic arms having at least one micromagnet;
one or more processors; and
a memory communicably coupled to the one or more processors and storing:
a device input module including instructions that when executed by the one or more processors cause the one or more processors to receive a device input from a user for the reversibly hardenable ferrofluid;
a field shaping module including instructions that when executed by the one or more processors cause the array of micromagnets to provide a magnetic field to the reversibly hardenable ferrofluid in the magnetic field chamber; and
a shape assignment module including instructions that when executed by the one or more processors cause the one or more processors to harden the reversibly hardenable ferrofluid at a desired shape.

14. The magnetic field chamber of claim 3, further including a hardenable magnetic substance.

15. The magnetic field chamber of claim 3, wherein the hardenable magnetic substance comprises a reversible hardening agent dispersed in a ferrofluid, the reversible hardening agent being capable of repeatably transitioning the ferrofluid between a liquid state and a solid state.

16. The magnetic field chamber of claim 3, wherein the one or more chamber walls comprise a base and a plurality of side walls, the base having one or more heating elements and one or more cooling elements.

17. The magnetic field chamber of claim 16, further comprising a membrane formed over the base.

18. The magnetic field chamber of claim 16, wherein the array of micromagnets are positioned on the base and at least one of the plurality of side walls.

19. The magnetic field chamber of claim 3, wherein the array of micromagnets are independent electromagnets.

* * * * *

UNITED STATES PATENT AND TRADEMARK OFFICE
CERTIFICATE OF CORRECTION

PATENT NO. : 11,498,270 B2
APPLICATION NO. : 16/197639
DATED : November 15, 2022
INVENTOR(S) : Michael Paul Rowe and Umesh N. Gandhi It is certified that error appears in the above-identified patent and that said Letters Patent is hereby corrected as shown below:

On the Title Page

In the (73) Assignee Field: delete "Toyota Motor Engineering & Manufacturing North America, inc.," and insert --Toyota Motor Engineering & Manufacturing North America, Inc.,--

In the Claims

Column 17, Line 29, Claim 8: delete "processors cause array of" and insert --processors cause the array of--

Column 18, Lines 10-12, Claim 13: delete "a plurality of actuators; connected to one or more micromagnets of the array of micromagnets," and insert --a plurality of actuators connected to one or more micromagnets of the array of micromagnets,--

Signed and Sealed this
Twenty-seventh Day of December, 2022

Katherine Kelly Vidal
*Director of the United States Patent and Trademark Office*